United States Patent [19]

Taylor

[11] 4,168,805

[45] Sep. 25, 1979

[54] STORAGE AND ICE DISPENSING SYSTEM FOR ICE IN FLAKE OR PARTICLE FORM

[76] Inventor: Frank W. Taylor, c/o Oregon Washington Fertilizer Co., 4425 Forest Ave. SE., Mercer Island, Wash. 98040

[21] Appl. No.: 892,090

[22] Filed: Mar. 31, 1978

[51] Int. Cl.² ............................................. B02C 18/00
[52] U.S. Cl. ................................ 241/101.2; 241/219; 241/260.1; 241/277; 241/DIG. 17; 414/318; 414/320
[58] Field of Search ............... 198/511, 519, 551, 558; 214/17 DB, 17 DA; 222/404, 271; 241/101.2, 260.1, 277, 283, DIG. 17, 219; 62/320; 414/318, 320

[56] References Cited

U.S. PATENT DOCUMENTS

| | | | |
|---|---|---|---|
| 2,511,246 | 6/1950 | Chamberlin | 214/17 DB X |
| 2,679,953 | 6/1954 | Field | 214/17 DB X |
| 2,791,887 | 5/1957 | Hennig | 214/17 DB X |
| 2,851,173 | 9/1958 | Morrison | 198/558 X |
| 3,456,818 | 7/1969 | Massey | 214/17 DB |
| 3,578,183 | 5/1971 | Larger | 214/17 DB |
| 3,968,998 | 7/1976 | Wolf | 241/260.1 X |

Primary Examiner—Mark Rosenbaum
Attorney, Agent, or Firm—Wegner, Stellman, McCord, Wiles & Wood

[57] ABSTRACT

A storage and dispensing system for ice in flake or particle form is disclosed utilizing a storage bin with driven screw augers extending outwardly over and above an ice storage space, the discharge end of the screw augers being pivotally mounted at the discharge end thereof with the other end of the augers being flexibly suspended for arcuate movement about the pivoted end to a position above the stored ice and being lowered into contact with the stored ice for auger dispensing, the auger being lowered as ice is discharged; the auger dispenser is oscillatable lengthwise during dispensing drive and is equipped with ice cutting blades on the outer edges of the screw flights and at the free end of such flights so as to ensure cutting a path through the particle ice as the conveyor device descends through the stored ice for dispensing purposes.

12 Claims, 5 Drawing Figures

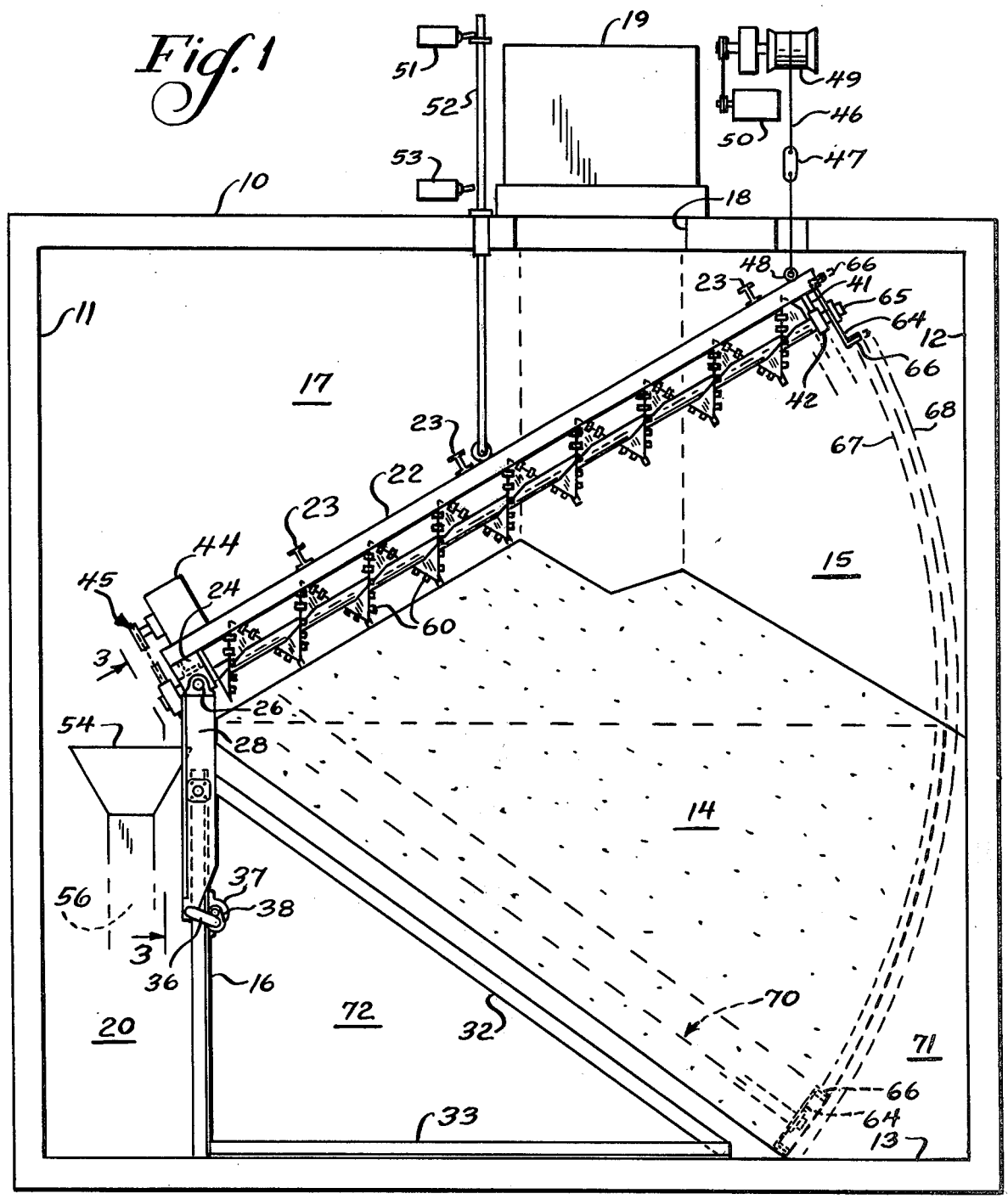

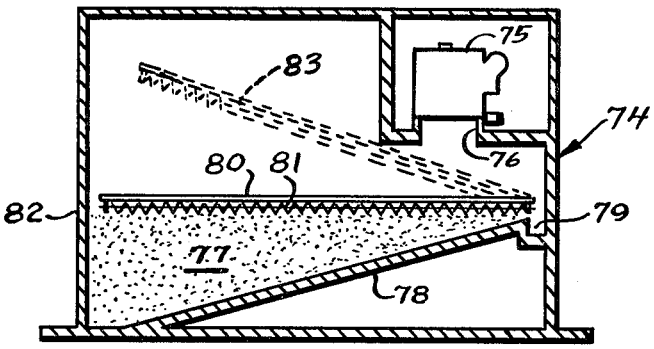
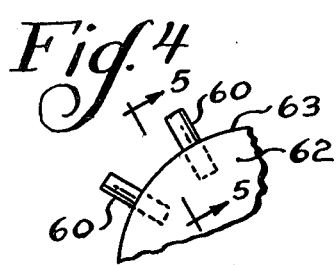
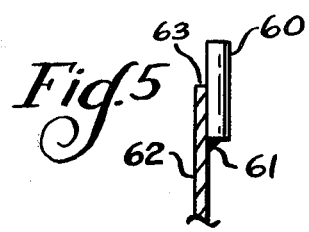
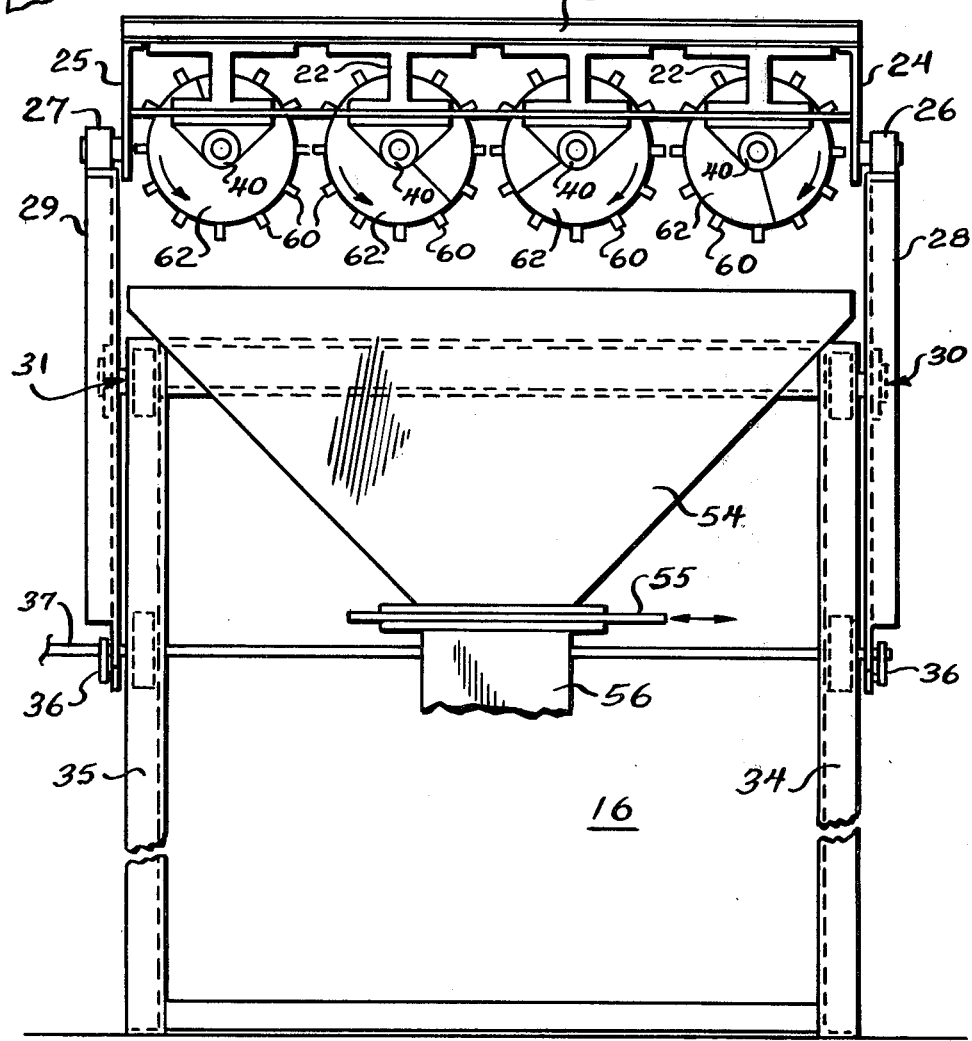

STORAGE AND ICE DISPENSING SYSTEM FOR ICE IN FLAKE OR PARTICLE FORM

BACKGROUND OF THE INVENTION

Ice is extensively used in industry in forms which have been variously defined as flake, crushed or shaved ice, all of which might appropriately be defined as particle-ice. Such ice is used in commerce and industry in various manufacturing processes and food processing plants, including fish, poultry, meat, dairy and other food processing plants, as well as in chemical processing plants, particularly in the die making art, and for precooling concrete where the ice is substituted for water in mixing of cement and aggregates.

Large ice making plants are extensively used in many of the above industries. One example is in dam construction where tons of ice per day are utilized to precool concrete. Such large ice production plants often have ice making machinery producing flake ice 24 hours a day, day in and day out, which ice is stored in large storage facilities of the order of 35 tons up to 500 tons capacity. There are several manufacturers of ice machines capable of producing the flake ice for such storage, one of the better known machines in the United States and throughout the world being made substantially in accordance with U.S. Pat. Nos. 2,735,275 and 2,910,841. Such machines are available commercially in various productive sizes ranging from 5 to 30 tons of ice per 24-hour day. The storage facilities for such ice are generally large insulated and sometimes refrigerated rooms which receive the ice directly from several ice making machines by gravity. Ice can be dispensed at various rates from such large storage facilities varying from dispensing rates of about 8 to 40 tons per hour. The dispensing facilities best known are those made in accordance with U.S. Pat. No. 2,511,246.

In various ice-utilizing industries, small quantities are often required which has given rise to temporary storage facilities which have generally become known as "day tanks". The day tanks are hopper constructed bins which can hold little more than 4,000 pounds of crushed or flake ice and have one or several driven augers in the bottom from which the sides of the bin are sloped outwardly and upwardly in order to feed the ice by gravity to the auger. Attempts to increase ice holding capacity of such day tanks have met with failure due primarily to the greatly increased horsepower required for the auger when a larger tank is attempted to be employed.

Flake and particle-ice have characteristics in storage quite different from other pulverulent materials. Ice may be piled up in a storage room with upright walls, and once the depth of ice is accumulated the walls could be removed and the ice would stand by itself as originally piled. Flake and particle-ice tend to set with pressure, tend to fuse with passage of time, will melt under pressure and fuse upon removal of the pressure and have a tendency to fuse to any metal parts with which it is in contact. Ice thus piled above a quiescent or nonmoving auger will tend to fuse to that auger if the depth of the ice is sufficient to create a pressure against the auger flight metal parts. Thus, day tanks larger than about 2 tons capacity have been impractical, yet a need has existed for less than the very large storage tonnage capacity facilities referred to above. Particle-ice referred to occupies about 60 cubic feet per ton (2,000 pounds) of fresh water ice. Such ice that is intended to remain in storage for a period of time before use is generally produced at or near 0° F. and in such form the ice is friable and can be pneumatically conveyed at high velocity through thin wall tubing and flexible rubber hose or by gravity for considerable distances. Various other mechanical conveyors may be used to deliver the ice to a desired point of use, such as augers within tubular enclosures, belts and chain and paddle conveyors.

SUMMARY OF THE INVENTION

The present invention discloses a novel particle-ice dispensing system utilizing twin counter-rotating augers normally maintained at rest out of contact with a stored mass of ice and lowered onto the top of the mass when ice is to be dispensed. The helical screw augers are not enclosed, but operate against the mass of ice to do the conveying operation. Ice cutting blades protrude from the edges of the flights to so as to extend outwardly from the flight envelope to aid in breaking the particle-ice loose from surrounding particles. Thus, the augers can break through any crusting or fusing of the ice that may have occurred while the ice was in storage. Additionally, the entire dispensing auger mechanism is oscillated lengthwise of the augers, and the dispensing direction, to break away any columns of ice within the path of the dispenser which might otherwise impair the lowering of the dispenser through the ice mass. It is the weight of the dispensing mechanism itself retarded by a suspending mechanism that lowers the dispenser through the mass of ice.

The ice dispenser of this invention allows day tanks to be constructed in various capacities without materially increasing the horsepower requirements for driving the dispensing mechanism. The use of the dispenser of this invention is larger than day tank storage facilities may be accomplished by the addition of end to end auger flights and the multiplication of side by side flights, it being understood that the horsepower increases proportionally to the added flights and the length of flights rather than upon any of the conditions of ice dispensing attributable to the quality of the ice stored.

It is the principal object of this invention to provide a new, novel and improved particle-ice dispensing system and mechanism.

Another object is to provide a novel mechanism for dispensing particle-ice from the top surface of a stored ice mass, such mechanism utilizing screw auger conveyors employing the ice mass itself as the confining medium for the augers.

Another object is to provide a particle-ice dispensing mechanism effective to allow screw auger flights to cut through stored particle-ice and dispense the same.

A further object is to provide a dispensing mechanism permitting an increase in the capacity of day tanks without substantially increasing the power requirements needed to dispense the ice.

An additional object of the invention is to provide an ice dispensing mechanism for stored particle-ice which is effective, economical of initial construction costs and operable economically with little maintenance required.

DESCRIPTION OF THE DRAWINGS

FIG. 1 is an elevational sectional view, partially diagrammatic, of an ice storage day tank equipped with the dispensing mechanism of this invention;

FIG. 2 is an elevational sectional view through a storage facility for particle-ice larger than a day tank illustrating diagrammatically the incorporation of the ice dispensing mechanism of this invention therein;

FIG. 3 is a partial broken upright sectional view through the dispensing end of the mechanism illustrated in FIG. 1, taken substantially along line 3—3 in FIG. 1, with the drive mechanism for the augers and day tank walls removed for clarity of illustration;

FIG. 4 is a broken enlarged upright view of one of the auger flight peripheral portions illustrating ice cutting blades attached thereto; and FIG. 5 is a broken sectional view through the edge of the flight taken substantially along line 5—5 in FIG. 4.

DESCRIPTION OF THE PREFERRED EMBODIMENT

A typical day tank is a three-dimension box-like building or bin which can receive ice either directly from an ice making machine, from a larger ice storage facility through a pneumatic tube, gravity feed or other conveyors, or which may receive ice which is trucked from another ice making location to the day tank. Such day tanks are frequently found in small food processing plants, sausage-making facilities, chemical plants and the like from which workmen extract small quantities of flake or particle-ice as the need therefor arises. Referring to FIG. 1, there is shown a day tank with insulated top wall 10, upright front wall 11, upright rear wall 12 and an insulated bottom 13 enclosing a space which will not be entirely filled with ice, but including a large mass of ice 14 within the storage space 15 extending from the rear wall 12 toward a partial height front wall 16 and the upright side wall 17 and a similar opposite wall, not illustrated. The day tank is generally cubical in nature, having an opening, such as the opening 18, in the top wall over which may be mounted an ice making machine 19 or other conveyor through which ice may be admitted into the day tank for storage in the mass 14. The upright wall 16 extends across the bin from wall 17 to the opposite wall and terminates short of the top wall 10, thus dividing the interior of the day tank into the ice storage space 15 occupying most of the interior of the day tank and an ice dispensing space 20 between the partial height wall 16 and the front insulated wall 11. It should be noted that access to the dispensing space is either through a door so that workmen can wheel a cart into that space to receive ice from storage or there may be a chute or other conveyor to receive the dispensed ice and carry it to a point of use outside the day tank.

The day tank illustrated has a capacity for flake ice storage of about 3 tons, the capacity being determined by the size of the day tank, the size of the dispenser and the fact that ice has a known angle of repose of about 30° to horizontal. The dispensing mechanism in the preferred form has a frame below which is suspended a plurality of generally parallel screw auger flights. Referring to FIGS. 1 and 3, longitudinally extending frame members 22 are braced by cross beams 23 so as to form a rigid open-network frame 24 to support the auger flights. At the front of the frame there are rigid metal arms 24 and 25 to which pillow bearing blocks 26 and 27 are secured for pivotally supporting the front of the frame upon a pair of upright arms 28 and 29 about which the entire frame and its auger flights may pivot. The arms have bearing supports 30 and 31 near the top of the partial height wall 16 so that the weight of the front of the conveyor system is carried on the top of the front wall 16 which may be adequately braced within the day tank by braces 32 and 33 as well as upright metal frame members 34 and 35. The lower end of the arms 28 and 29 are connected by links 36 to a motor driven shaft 37 which provides an oscillation back and forth of the arms through the crank mechanism 38, best illustrated in FIG. 1. A small horsepower motor mounted exteriorly of the day tank may be used to rotate the shaft 37 to provide the oscillation for purposes which will become clear.

The screw auger flights are helical flights available in various sizes and lengths. Such flighting is available from various sources in standard diameters of 9", 12", 14" and the like with standard lengths of 10', 12', 14' and the like. In the typical day tank illustrated, four such flights are suspended from the rigid frame, there being pillow bearing blocks, such as 40, at the front of the frame, one for each flight. An extension 41 at the rear of the frame provides support for a pillow block 42 at the rear of each flight. The pillow blocks engage and give bearing support to an extension of the central shaft of each flight beyond the helical surfaces of the auger. A motor 44 of about 5 h.p. is provided with suitable gearing and chain drive mechanism 45 coupled with the shafts of the screw flight augers to drive the same in the direction of the arrows illustrated in FIG. 4. It may be noted that the two center shafts are counter-rotating so as to cooperate in the conveying of the ice toward the discharge end over the top of the partial height wall. The outer screw flights rotate in the direction of the arrows as shown in FIG. 3 and feed ice toward the center of the conveying mechanism.

The conveying mechanism is supported at its discharge end on the pivots 26 and 27 at the top of the arms and suspended at its opposite end upon a cable 46 including a spring loaded tension switch 47 in its length extending between a connection to the conveyor frame at 48 and a pulley 49 driven by a motor 50 through appropriate gearing and chain drive. In FIG. 1 the conveyor is shown in its at-rest position. Electrical controls are incorporated in a dispensing system such that a push-button type of demand can be made upon the system to dispense ice and the operations of the mechanism are automatically controlled thereafter. For example, an upper limit switch 51 is operable off of a feeler rod 52 as is a lower limit switch 53. Once dispensing is stopped the automatic controls lift the entire conveyor mechanism to the position in FIG. 1, that position being sensed by the upper limit switch 51. Upon a call for ice dispensing initiated by a workman pushing a dispensing button, the controls through the operation of the motor 50 and the suspended cable 46 lowers the swinging end of the conveyor rapidly until the tension switch 47 senses that the ice has been engaged by the conveyor by lessening the tension in the cable 46. Also motor 44 was energized to begin turning the screw auger flights upon the initial demand of ice dispensing. Once the auger flights engage ice in storage, dispensing thereof over the partial height front wall 16 into a hopper, diagrammatically illustrated at 54, will occur so that a workman might open a sliding gate 55 and receive ice into a cart through upright chute 56, for example. Motor 50 lowers the conveying mechanism at a controlled rate after the ice is engaged so that dispensing is at a controlled rate.

Particle-ice that has been in storage for some time may tend to fuse one particle to another and such fused ice has a substantial compressive strength which can support considerable weight. In order to break up the ice the auger flights are provided at spaced intervals along the edges of the helical flights with a plurality of ice cutting blades or teeth 60 which may be flat steel pieces, for example 1" by ¼" by 3" long, welded as at 61 to the edge of the flight 62 so as to extend outwardly from the outer periphery 63, perhaps ½" to 1". As the entire frame and the screw augers are oscillated by the supporting arms 28 and 29, the teeth 60 engage new areas in the ice mass and tend to dislodge the particles into a flowable state so that the conveyors can auger the same toward the discharge end. The amount of endwise oscillation of the augers need only be 2" or 3" to accomplish the purpose. An additional ice cutting blade 64 is mounted on the stub end 65 of the shaft of each auger, such blade being a narrow metal member extending across a diameter of the shaft and having outwardly extending blade parts 66 at about the cylindrical envelope of the auger. The oscillation of the entire unit is illustrated as occurring between a dotted arcuate upright line 67 showing the inner extremity of the oscillation and a similar arcuate dotted line 68 showing the outer extremity of the oscillation. The 2" to 3" of oscillation is enough to provide for the breaking away of any ice which might form a column under the bearing supports 42 at the suspended end of the frame.

It may be noted that in the day tank the movement of the ice dispensing mechanism between the "up" position shown in FIG. 1 and the dotted line "down" position 70 at the bottom does not bring the dispenser in contact with an area or space 71 at the bottom right-hand corner of the day tank or with the space 72, triangular in shape, below the lower position of the dispensing mechanism. Ice can fill the spaces, such as 71 and 72, and will remain therein, such ice being a rather economical filler for such space since, at present energy costs, ice can be produced at about $2.00 per ton. Such ice does not deteriorate or affect the stored or dispensing ice in any way.

The motor driving the screw augers is reversible so that the augers can be used to spread ice within the storage compartment should such be needed. Ice making machines produce ice constantly through a 24-hour day, and a mechanism may be employed to reverse the rotation of the screw augers to spread ice so dispensed and to even it out for its natural repose angle of 30° to horizontal within the day tank. The ice making machine can be mounted directly over the ice dispensing mechanism since ice and flakes will fall by gravity through the openness of the dispensing mechanism without difficulty.

The present day tank helical auger type of dispenser may be used in much larger storage by adding standard flight lengths end to end with the augers used in a day tank and by increasing the number of side by side augers. Referring to FIG. 2, a larger storage facility 74 is shown as equipped with a number of ice making machines 75 which discharge ice constantly through bottom openings 76 into an ice storage space 77. The building is fully insulated and in some instances may be refrigerated. It is provided with an insulated sloping bottom wall 78 to a dispensing space 79 usually equipped with mechanical conveyor mechanisms. The frame 80 of the ice levelling and dispensing mechanism is shown as supporting augers 81 therebelow such that the frame would be pivoted above the dispensing space 79 and extend outwardly over the ice storage space. As ice is received from the ice making machine 75 near the front of the storage area, the augers are utilized to move that ice toward the rear wall 82 of the facility. The dotted line position 83 of the dispensing mechanism illustrates that the ice may be augered into a depth near the wall 82 approximately no more than 30° to horizontal from the dispensing end. It is ordinarily desirable that the auger flights with their extending ice cutting blades be mounted within the day tank or storage facility so that they clear the side walls of the tank by perhaps 1", but probably no more than 2".

The downward swinging of the dispensing mechanism comes closest to an end wall, such as 12 (FIG. 1) at a position where the dispenser is about horizontal. The clearance between the end ice cutting blades 64 and the wall at that point is also preferably about 1". While some ice in storage will never be contacted by the dispensing mechanism illustrated, this is of no concern since such ice constitutes but a filler within the storage facility and does not affect adversely any of the ice that is dispensed.

I claim:

1. A particle-ice dispenser for an ice storage bin comprising:
   a rectangularly shaped frame pivotally supported within a bin at one end and suspended at its opposite end for swinging up and down movement about the pivoted end both above and below horizontal by about 30°,
   driven screw flight augers supported by the frame therebelow and extending from the pivoted end toward the suspended end,
   wall means in said bin below the frame pivoted and separating the bin into ice storage space below the augers and ice discharge space past the pivoted end of the frame, and
   a mechanical oscillating drive operatively associated with the pivoted frame end for oscillating said auger flights lengthwise thereof while the augers are driven for ice dispensing.

2. An ice dispenser as specified in claim 1 including a plurality of ice cutting teeth protruding from said auger flights at spaced intervals therealong.

3. An ice dispenser as specified in claim 1 including a bearing support for each flight depending from the suspended end of said frame, said flight having a shaft passing through the bearing and an ice cutting blade secured to said shaft beyond the bearing support for said flight for clearing ice out from under the bearing support as the frame is oscillated.

4. A storage and dispensing device for ice in flake and particle form, comprising:
   a three-dimensional bin having a partial bin-height interior wall dividing the bin interior into a relatively large ice storage space and a relatively small ice discharge space across one end of the bin interior,
   an ice inlet in the bin over the storage space for gravity ingress of ice,
   an ice outlet in the bin discharge space for egress of ice dispensed from the storage space over the top of the interior wall,
   a helical screw auger conveyor having a pair of driven counter-rotating auger flights extending outwardly over the storage space from the top of said interior wall,
   frame means including bearing supports for the auger flights, said frame means being pivotally supported at the top of the interior wall,
   means for raising the frame and conveyor about said pivotal support to a starting position above the stored ice and lowering same so that said augers may contact ice in the storage space and convey same to the discharge space, and means for oscillating the auger flights lengthwise thereof an amount at least equal to the length of said bearing supports for the auger flights so that the augers may contact ice in storage below said bearing supports.

5. An ice storage and dispensing device as specified in claim 4 wherein, said auger conveyor frame is supported over the storage space by flexible tension hangers with motor means for raising the augers above ice storage height in the bin and to lower the augers through an arc to about 30° below horizontal about said pivotal support at the top of said interior wall.

6. An ice storage and dispensing device as specified in claim 4 wherein, said auger frame is pivotally mounted on a pair of spaced upright arms, said arms being pivotally secured adjacent the top of said interior wall and power means are attached to the arms to oscillate the arms, frame and augers lengthwise thereof while the augers are rotating to convey ice from bin storage space to bin discharge space.

7. An ice storage and dispensing device as specified in claim 4 wherein, the auger flights each include a helical surface auger on a central longitudinal shaft with the surfaces laying within a cylindrical envelope, and a plurality of teeth extending outwardly from the flight surfaces beyond said envelope at longitudinally spaced intervals for biting into and disturbing the ice in storage, said teeth on each auger flight being located for out-of-contact travel relative to auger flight surfaces of an adjacent auger flight.

8. An ice storage and dispensing device as specified in claim 4 wherein each auger flight is provided with an ice cutting blade secured to and rotatable with the auger at the end of the flight remote from said interior wall, said blade having cutting surfaces to remove ice beyond the auger flight surfaces to clear away ice beyond the auger surfaces and under the bearing supports permitting unimpeded lowering of the conveyor as stored ice is discharged.

9. A flake and particle ice storage and dispensing device, comprising:

a fully insulated three-dimensional bin having an interior partial bin-height wall dividing the bin interior into relatively large storage space and relatively small discharge space, bin ingress means for gravity ice flow into the storage space, bin exit means for ice dispensed from said discharge space, an ice excavator including:

a frame pivoted at one end just above the top of said partial-height wall, and extending outwardly over the ice storage bin space, flexible means suspending the opposite frame end from the top of the bin between an upper position out of contact with stored ice and lower positions engaging such ice, at least one pair of reversibly driven counter-rotating screw augers having bearing supports secured to and suspended below said frame, said augers being swingable with the frame about said pivot and substantially filling said storage space in plan when lowered to horizontal position, and means for oscillating said frame and augers longitudinally of the augers an amount at least equal to length of bearing supports for the augers, said augers being elevated at the dividing wall to dispense ice thereover into the discharge space, said augers spreading incoming ice away from the wall when rotated one direction and augering ice from storage into the discharge space upon reverse rotation.

10. A day tank flake ice dispensing mechanism, comprising:

a rotary screw auger conveyor having at least two powered counter-rotating flights extending side by side across an ice storage bin, a frame above the flights having depending bearing housings supporting the flights, said frame having a pivoted support at one ice discharge end of the augers and being suspended at the opposite end for arcuate swinging about said pivoted support in up and down movement of the frame and supported auger flights between an upper position out of contact with stored ice and lower positions engaging such ice, and means for oscillating the frame and auger flights as a unit endwise of the flights during ice dispensing, the maximum oscillation being at least equal to the length of said bearing supports measured longitudinally of the auger flights.

11. An ice dispensing mechanism as specified in claim 10 including an ice cutting blade on the end of each auger flight remote from the discharge end, each blade being secured to and rotatable with the auger flight and having a length at least equal to flight width to clear ice away from under the extremity of frame movement in the day tank.

12. An ice dispensing mechanism as specified in claim 10 including a plurality of spaced, outwardly extending, ice cutting teeth secured to the outer extremities of said auger flights positioned for out-of-contact rotation with the adjacent counter-rotating flight.

* * * * *